United States Patent
Chen (12)

(10) Patent No.: US 6,223,970 B1
(45) Date of Patent: May 1, 2001

(54) DIE SET FOR WELDING FINS AND A BASE PLATE OF A HEAT SINK

(76) Inventor: Yang-Shiau Chen, 10Fl., No, 406, Sec. 4, Jan Ai Rd., Taipei (TW)

(*) Notice: Subject to any disclaimer, the term of this patent is extended or adjusted under 35 U.S.C. 154(b) by 0 days.

(21) Appl. No.: 09/309,548

(22) Filed: May 11, 1999

(51) Int. Cl.[7] ............................... B23K 37/04; B23K 3/00
(52) U.S. Cl. ............................................. 228/44.3; 228/51
(58) Field of Search ........................ 228/44.3, 51, 235.1, 228/212, 49.1

(56) References Cited

U.S. PATENT DOCUMENTS

| | | | |
|---|---|---|---|
| 5,184,211 | * | 2/1993 | Fox ........................................ 257/706 |
| 5,199,164 | * | 4/1993 | Kim et al. ............................... 29/840 |
| 5,358,032 | * | 10/1994 | Arai et al. ............................ 165/80.3 |
| 5,421,406 | * | 6/1995 | Furusawa et al. ..................... 165/185 |
| 5,548,482 | * | 8/1996 | Hatauchi et al. ...................... 361/720 |
| 5,625,229 | * | 4/1997 | Kojima et al. ......................... 257/712 |
| 5,726,495 | * | 3/1998 | Aihara et al. .......................... 257/722 |
| 5,771,966 | * | 6/1998 | Jacoby ................................... 165/185 |
| 5,894,882 | * | 4/1999 | Kikuchi et al. ...................... 165/80.3 |
| 5,912,802 | * | 6/1999 | Nelson ................................... 361/695 |

* cited by examiner

Primary Examiner—Geoffrey S. Evans
Assistant Examiner—Kiley Stoner
(74) Attorney, Agent, or Firm—Bacon & Thomas

(57) ABSTRACT

A die set for welding fins and a base plate of a heat sink, it is used to complete fixing of the U shaped heat sinking fins and the base plate of the heat sink by welding. It has the object to increase heat-sinking efficiency and to render the welding process to finish fast. The die set comprises mainly a first die seat and a second die seat. Wherein, the first die seat is disposed beneath the base plate of the heat sink to support the latter. While the second die seat is disposed above the U shaped heat sinking fins, and is comprised of a pressing portion and a connecting portion. The pressing portion is provided in corresponding to the lower bends of the U shaped fins with pressing bars. The connecting portion having a plurality of connecting ends is provided on the bottoms of the pressing bars to supply energy to generate large heat. When the pressing portion exerts force on the pressing bars, the U shaped fins are pressed against the top of the base plate and get large heat by means of the connecting portion. Thereby, the U shaped heat sinking fins are quickly welded to the base plate.

7 Claims, 10 Drawing Sheets

PRIOR ART

Fig. 3

PRIOR ART

DIE SET FOR WELDING FINS AND A BASE PLATE OF A HEAT SINK

BACKGROUND OF THE INVENTION

1. Field of the Invention

The present invention relates to a die set for welding fins and a base plate of a heat sink, it is used to complete fixing of the U shaped fins and the base plate of the heat sink by welding. It has the object to increase heat-sinking efficiency and to render the welding process to finish quickly.

2. Description of the Prior Art

Figure 1:
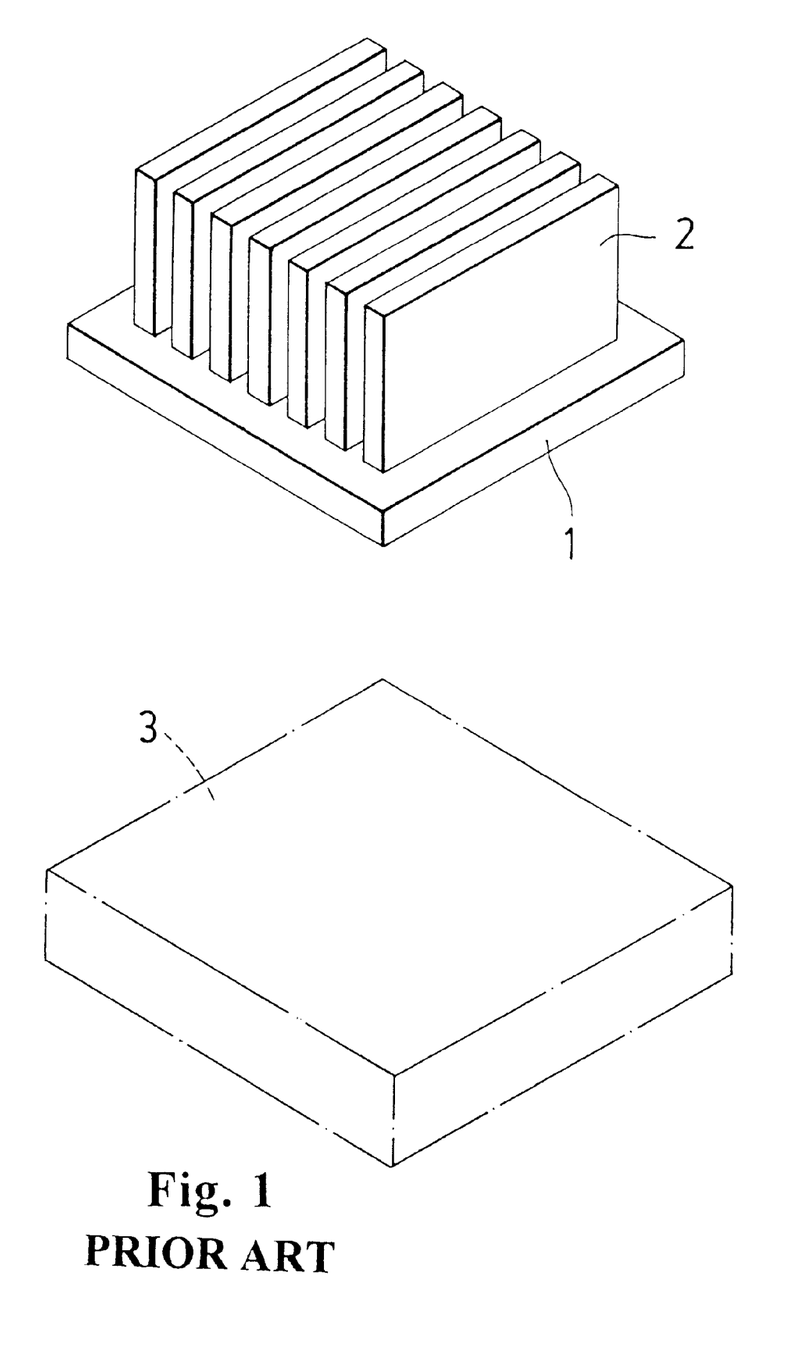
FIG. 1 is a perspective view of a conventional heat sink made of aluminum and made integrally by extrusion process.

Conventional heat sinks are all made of aluminum by virtue that aluminum has high heat conduction efficiency and low cost of material. The structure of such a conventional heat sink is shown in FIG. 1, and is comprised of a base plate 1 and a plurality of heat sinking fins 2 provided on the top of the base plate 1. Wherein, the bottom of the base plate 1 is mounted on the top surface of an appliance 3 to be processed for heat sinking. While the heat sinking fins 2 are mounted above the base plate 1 in order to fast transmit the heat with high temperature absorbed by the base plate 1 to each heat sinking fin 2. Then by convection of the heat sinking fins 2 with cool air, the high temperature on the appliance 3 can be reduced.

When in manufacturing of a conventional heat sink, extrusion process is always used to integrally make it by virtue that aluminum has high ductility and low melting point. However, the conventional heat sink made by extrusion process has the defect that the heat sinking fins in the extrusion process are supposed not to be too thin, and the distance between every two fins shall not be too short. Otherwise, material supply for the fins in the extrusion process will be sometimes smooth and sometimes intermittent. Therefore, amount of the heat sinking fins is limited, and heat sinking area will be reduced. On the contrary, thicker fins cost higher, and are heavier; they are not good for computers which develop very fast nowadays.

Figure 2:
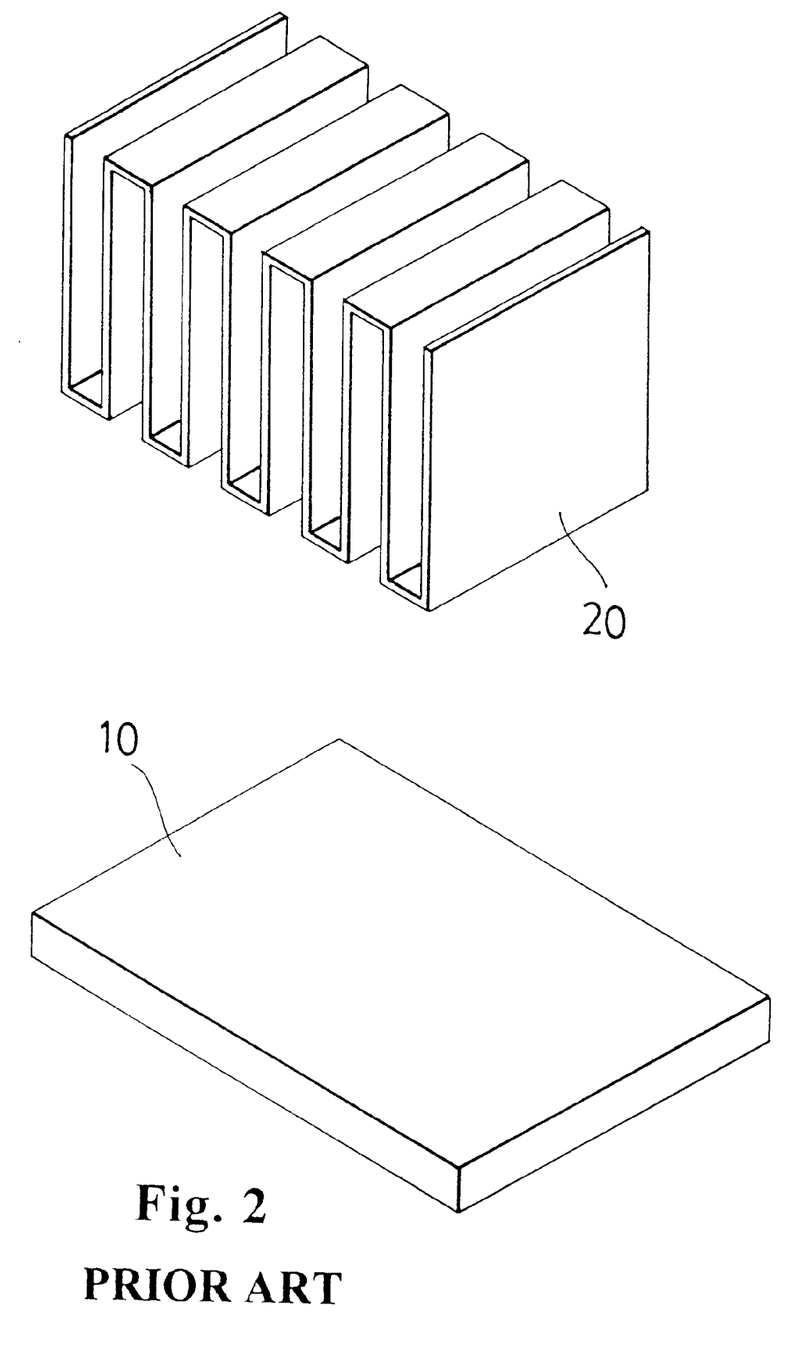
FIG. 2 is an analytic perspective view of a conventional combined heat sink.
Figure 3:
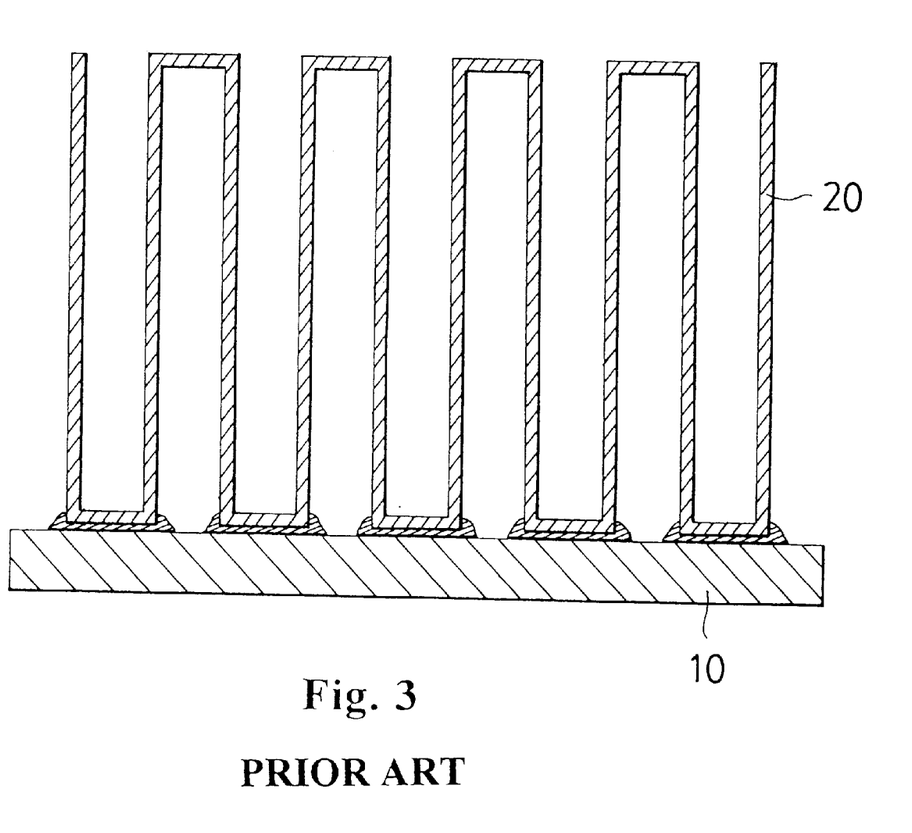
FIG. 3 is a sectional side view of the conventional combined heat sink.

In view of the above mentioned defects of the extrusion process for heat sinks, one kind of heat sink as shown in FIG. 2 and 3 has been developed in the art. Construction of the heat sink includes serially bending a plurality of heat sinking fins 20 to form a plurality of U shaped bends; the bottom surfaces of the bends are plain. A base plate 10 provided for the heat sinking fins 20 is in the form of a plain plate. The plain bottom surfaces of the bends are placed on and stuck to the top surface of the base plate 10; and assembling of the heat sink is completed.

Such a heat sink which is combined from the base plate 10 and the heat sinking fins 20 manufactured separately forms a structure having serial U shaped bends, thereby the thickness of the heat sinking fins 20 can be reduced. And the effects of heat conducting and heat sinking can thus be better; this can exactly overcome the defects of the first mentioned conventional heat sinks made integrally. However, there is no appropriate equipment or tool for constructing such a combined heat sink from the base plate 10 and the heat sinking fins 20. Only glue is applied in advance at the areas where the base plate 10 and the heat sinking fins 20 are to be combined mutually. This is inconvenient for automatic production. Evidently, glue especially adversely influences the heat conducting effect between these two parts.

SUMMARY OF THE INVENTION

In view of this, the inventor of the present invention provides a die set for welding fins and the base plate of a heat sink based upon his professional and doctoral knowledge (from Ohio State University) of manufacturing engineering and practical experience of years in study, designing and development of the structure of such a combined heat sink. Such a die set can solve the problems resided in constructing as well as manufacturing of a heat sink.

Particularly, the die set for welding fins and the base plate of a heat sink is comprised mainly of a first die seat and a second die seat. Wherein, the first die seat is disposed beneath the base plate of the heat sink to support the latter. While the second die seat is disposed above the U shaped heat sinking fins, and is comprised of a pressing portion and a connecting portion. The pressing portion is provided in corresponding to the lower bends of the U shaped heat sinking fins with pressing bars. The connecting portion having a plurality of connecting ends is provided on the bottoms of the pressing bars to supply energy to generate large heat. When the pressing portion exerts force on the pressing bars, the U shaped heat sinking fins are pressed against the top of the base plate and are quickly welded thereto by the large heat produced by the connecting portion.

The primary object of the present invention is to provide a die set for welding process capable of increasing heat-sinking effect of a heat sink. After the U shaped heat sinking fins and the base plate of the heat sink are combined with the welding die set; there is no medium between them. Therefore, the large heat absorbed by the base plate can be transmitted very fast to the U shaped heat sinking fins, and thus heat sinking effect of the heat sink can be increased.

The secondary object of the present invention is to provide a die set for welding process capable of reducing cost of a heat sink by fast production. By providing the structure of the die set, multiple die sets can be provided on a production line. Welding process of each heat sink needs only two seconds to complete combining. This is good for automatic mass production, and therefore can lower cost of production.

The present invention will be apparent in its particular structure and effects after reading the detailed description of the preferred embodiments thereof in reference to the accompanying drawings.

DETAILED DESCRIPTION OF THE PREFERRED EMBODIMENT

Figure 4:
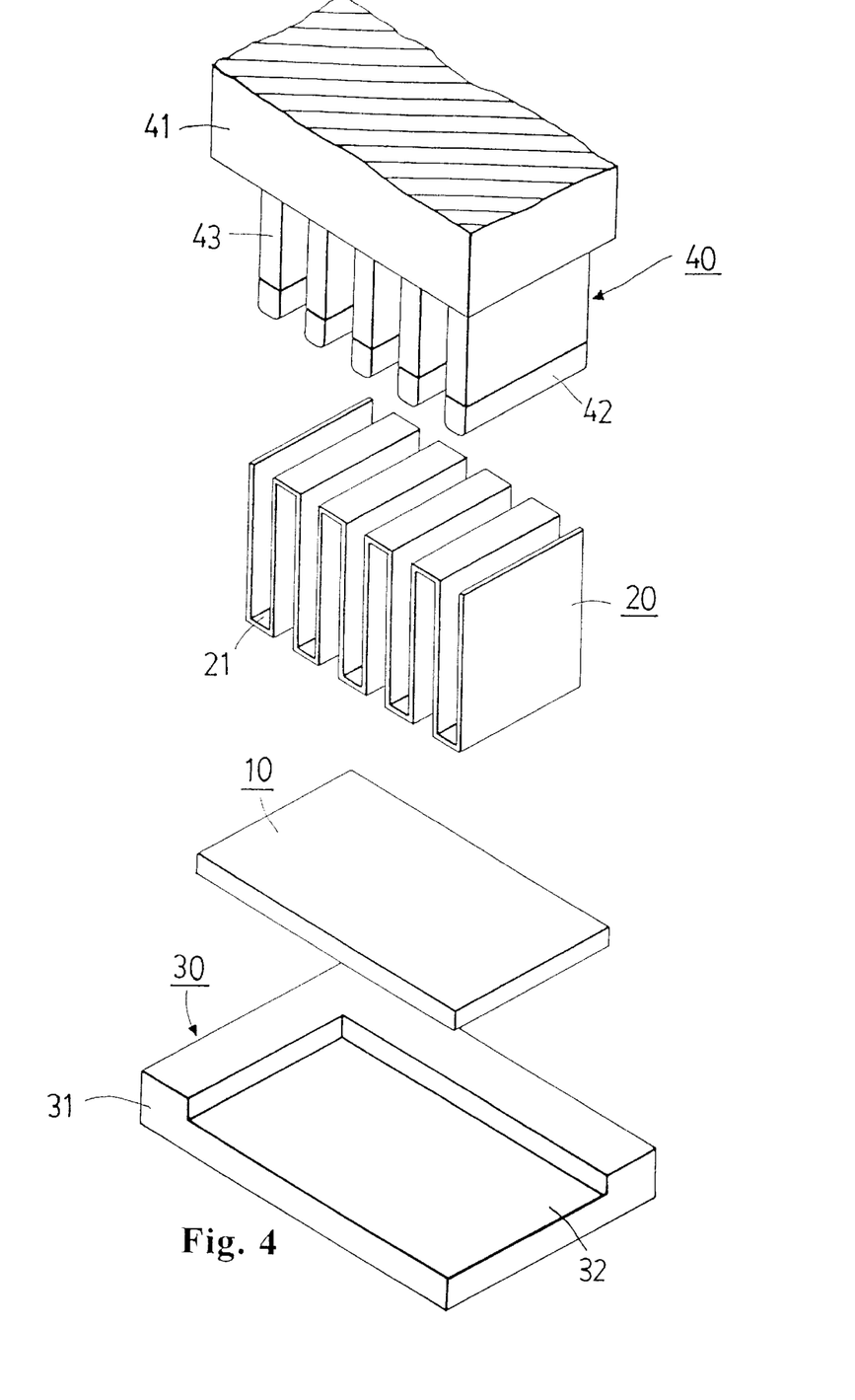
FIG. 4 is an anatomic perspective view of the combined heat sink of the present invention.
Figure 5:
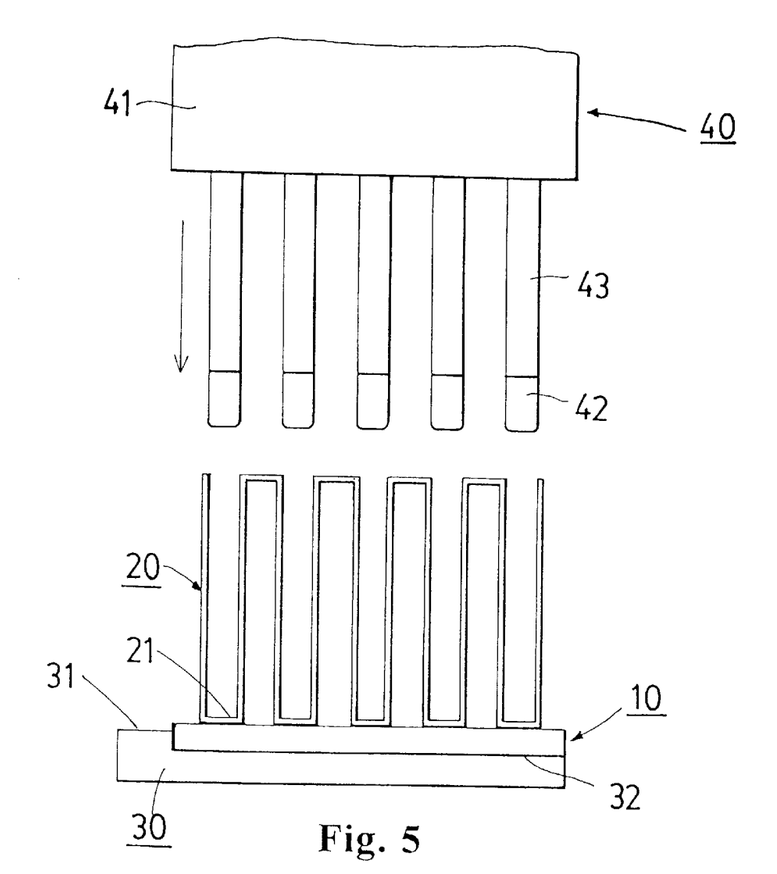
FIG. 5 is a schematic view showing combining of the combined heat sink of the present invention.
Figure 6:
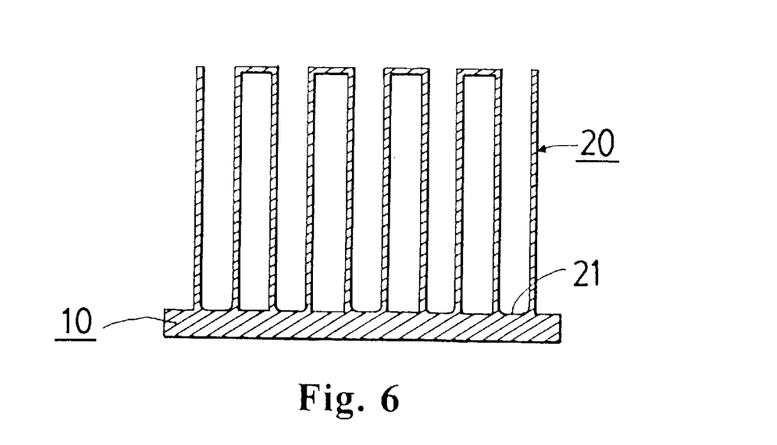
FIG. 6 is a sectional side view of a completed combined heat sink of the present invention.

Referring to FIGS. 4 to 6, the die set for welding fins and the base plate of a heat sink of the present invention is designed in pursuance of the combining process of the combined heat sinks sold in the markets presently. Construction of such a heat sink includes serially bending a plurality of heat sinking fins 20 to form a plurality of U shaped bends; the bottom surfaces of the lower bends 21 are plain. A base plate 10 provided for the heat sinking fins 20 is in the form of a plain plate. The plain bottom surfaces of the bends 21 are placed on and stuck to the top surface of the base plate 10, and assembling of the heat sink is completed.

The die set for welding of the present invention is comprised mainly of a first die seat 30 and a second die seat 40. Wherein, the first die seat 30 is disposed beneath the base plate 10 of the heat sink to support the latter. While the second die seat 40 is disposed above the U shaped heat sinking fins 20, and is comprised of a pressing portion 41 and a connecting portion 42. The pressing portion 41 is provided for each of the lower bends 21 of the U shaped heat sinking fins 20 with a pressing bar 43. The connecting portion 42 having a plurality of connecting ends is provided on the bottoms of the pressing bars 43 to supply energy to generate large heat. When the pressing portion 41 exerts force on the pressing bars 43, the U shaped heat sinking fins 20 are pressed against the top of the base plate 10 and are quickly welded thereto by the large heat produced by the connecting portion 42.

The first die seat 30 of the present invention is used to support the base plate 10. Structurally, a supporting plate 31 is formed on the top the first die seat 30, and a recess 32 is formed on the balance area of the top surface of the first die seat 30 conforming in shape with the base plate 10 of the heat sink. The recess 32 is provided for positioning the base plate 10. When the base plate 10 is placed in the recess 32 next to the supporting plate 31, it is borne and fixed on the first die seat 30 for welding process.

In the second die seat 40 of the present invention, pressing force exerting onto the pressing portion 41 can be obtained from a gas or liquid compressing cylinder. Heat produced by the connecting portion 42 is high up to about 650° C., this heat energy can be converted from electric or mechanical energy and is used to quickly weld the lower bends 21 and the top surface of the base plate 10 contacting therewith.

Figure 7:
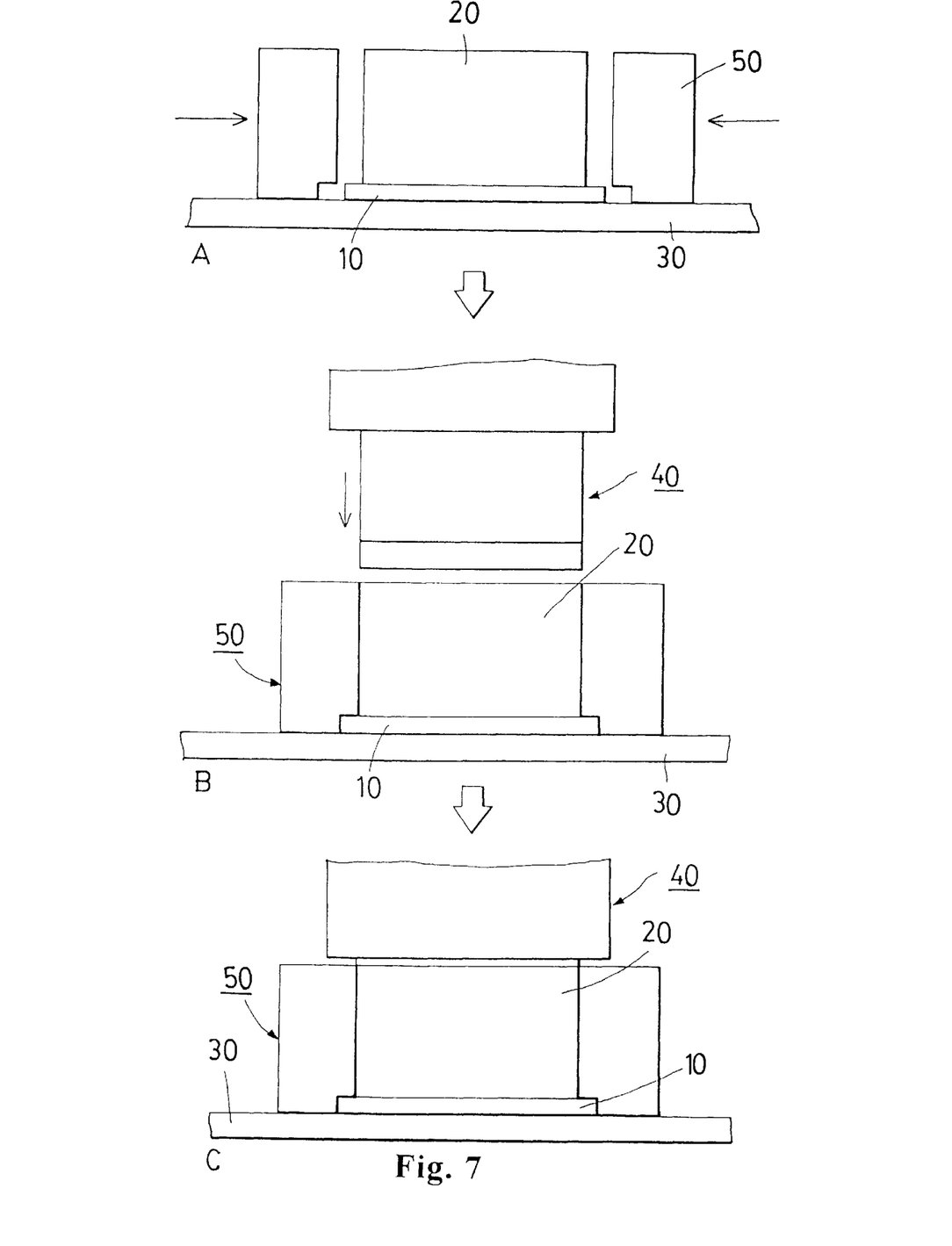
FIG. 7 schematic view showing operation of a second embodiment of the present invention.

Referring to the second embodiment of the present invention shown in FIG. 7, it is provided mainly for solving the problems of positioning and delivering during the welding process of the base plate 10 and the heat sinking fins 20. Wherein, it is primarily to add a clamp holder 50 to position by clamping the base plate 10 and the heat sinking fins 20 at the lateral sides thereof before the welding process (as shown by "A" in FIG. 7). And then the base plate 10 and the heat sinking fins 20 are placed on the first die seat 30 (as shown by "B" in FIG. 7). Thereafter, the second die seat 40 is moved downwardly to proceed with the welding process of the base plate 10 and the heat sinking fins 20 (as shown by "C" in FIG. 7). When the second die seat 40 is moved upwardly a after completion of this process, the base plate 10 and the heat sinking fins 20 having been welded are removed with the clamp holder 50.

Figure 8:
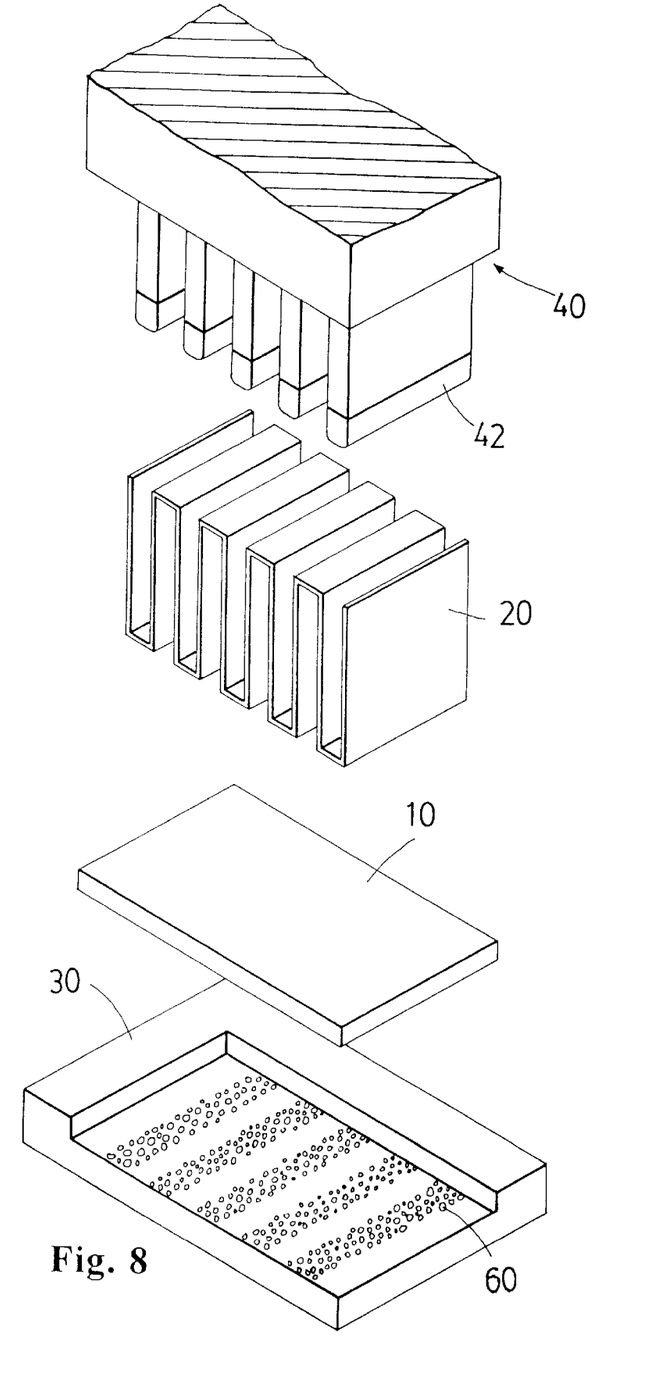
FIG. 8 is a perspective view of the third embodiment of the present invention.
Figure 9:
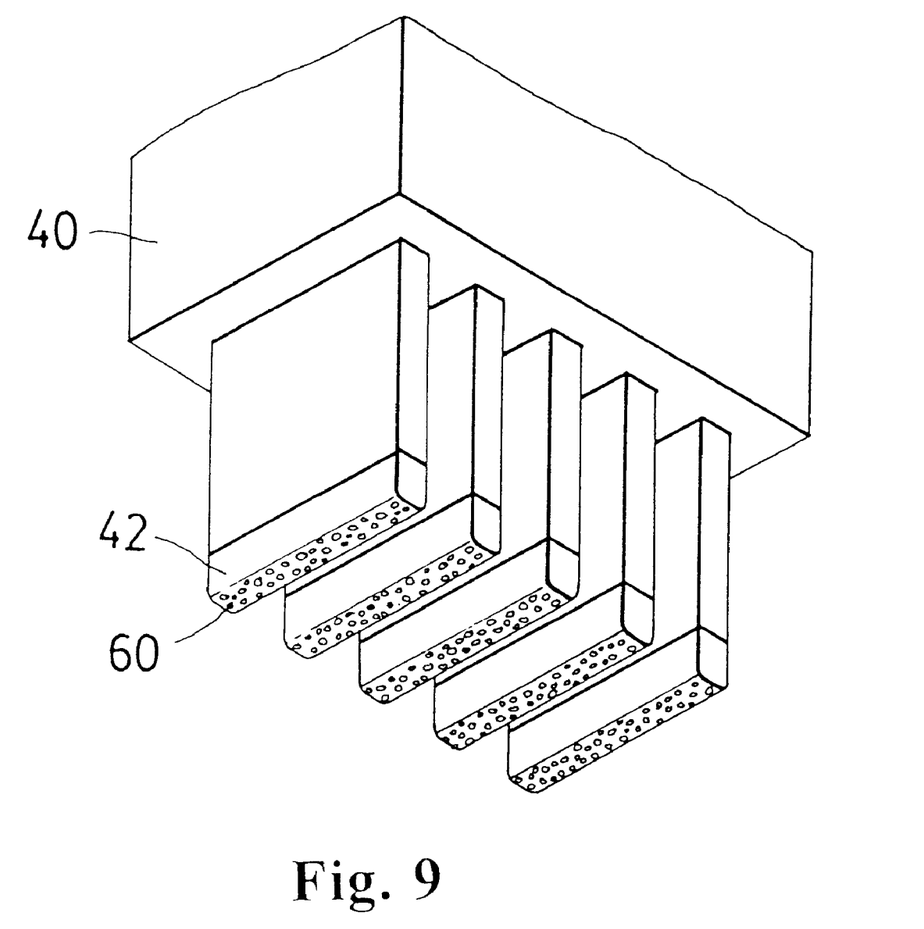
FIG. 9 is a perspective view of the fourth embodiment of the present invention.
Figure 10:
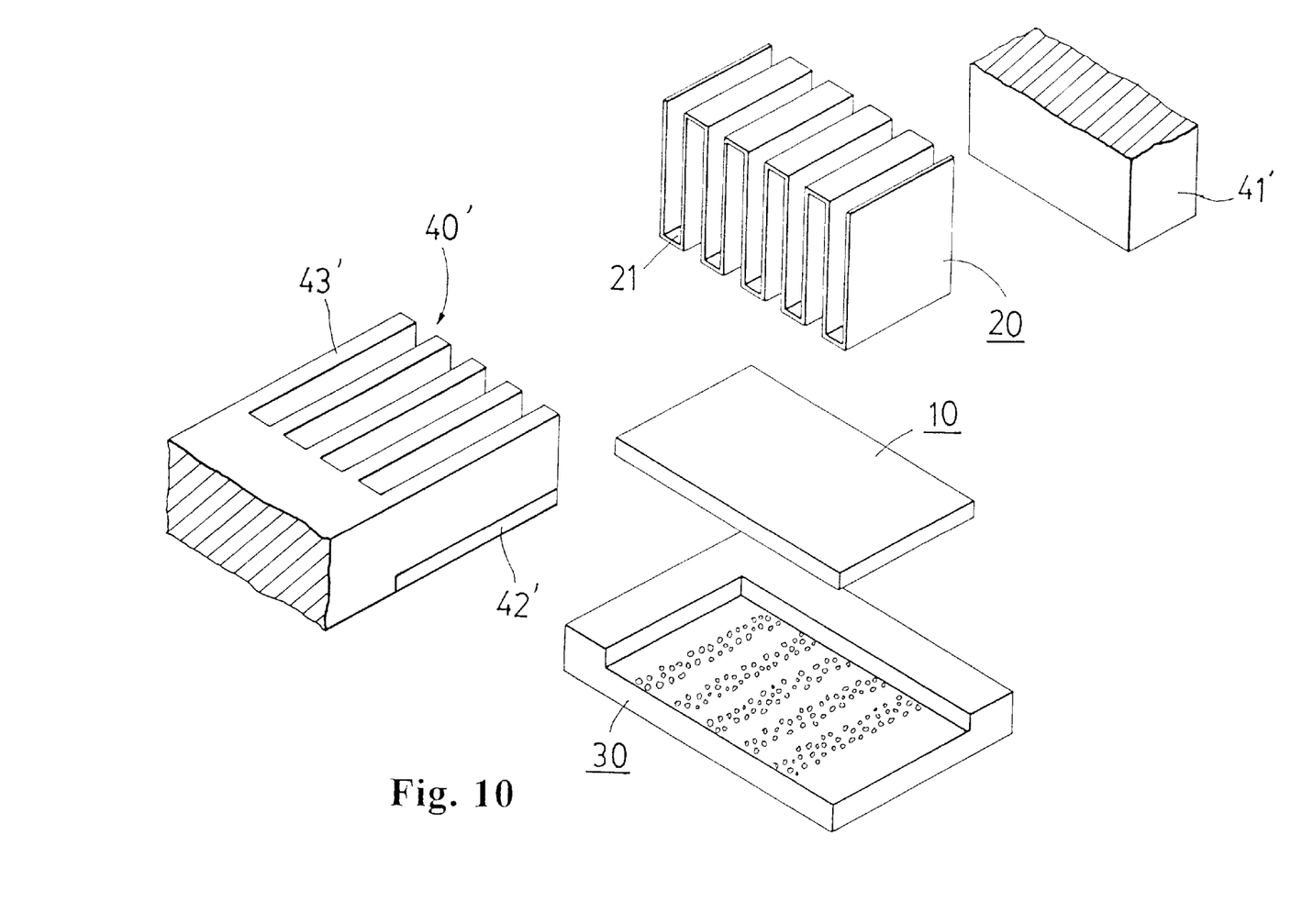
FIG. 10 a perspective view of the fifth embodiment of the present invention.
Figure 11:
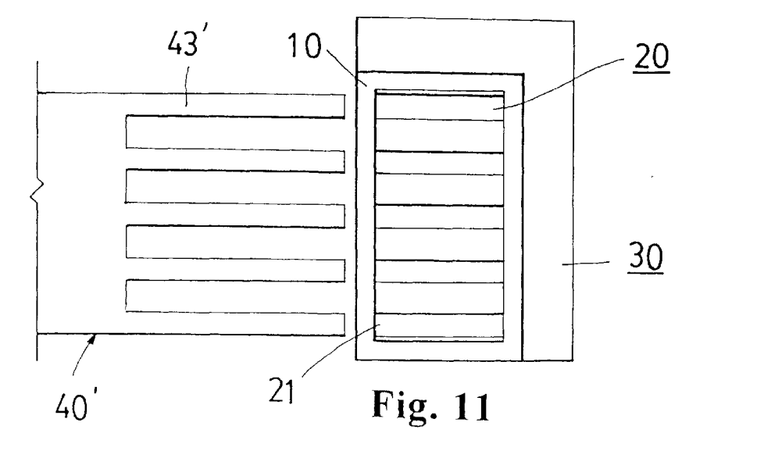
FIG. 11 is a top view showing the state of the fifth embodiment of the present invention before practicing.

Referring to the third and fourth embodiments of the present invention shown in FIG. 8 and 9, two ways are feasible for increasing the speed of welding process. Wherein, it is primarily to provide a lot of micro-protuberances 60 on the top of the first die seat 30 (FIG. 8) or on the bottom of the connecting portion 42 of the second die seat 40 (FIG. 9) in corresponding to the areas of welding between the base plate 10 and the heat sinking fins 20. And during the welding process, the second die seat 40 is exerted with larger pressing force to form undulated contact areas from the micro-protuberances 60 between the base plate 10 and the heat sinking fins 20. At this moment, the undulated contact areas are molten firstly to speed up the melting process.

Figure 12:
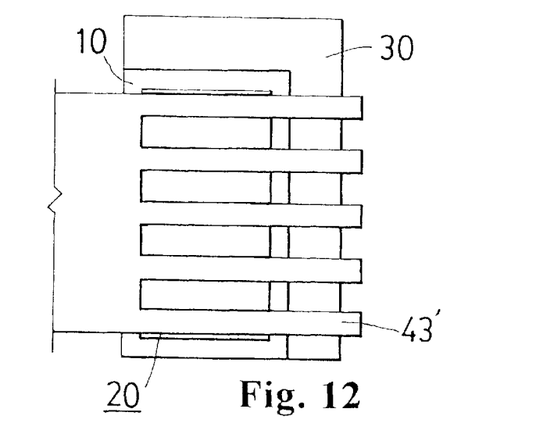
FIG. 12 is a top view showing the state of the fifth embodiment of the present invention in starting to put to practice.
Figure 13:
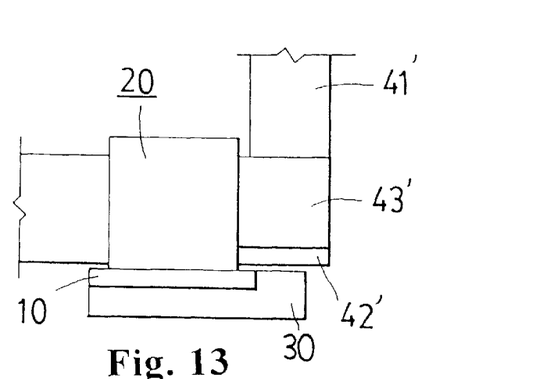
FIG. 13 is a side view showing the state of the fifth embodiment of the present invention in starting to put to practice.

Referring to the fifth embodiment of the present invention shown in FIG. 10 to 13, a variation of the second die seat 40, namely, a second die seat 40' is disclosed here. As is shown, the second die seat 40' is separately provided with a pressing portion 41' and a plurality of pressing bars 43'. The pressing bars 43' are located aside of the U shaped heat sinking fins 20. A connecting portion 42' having a plurality of connecting ends is too provided on the bottoms of the pressing bars 43'. And as shown in FIG. 12 and 13, the pressing bars 43' are pushed transversely toward the heat sinking fins 20 to move the connecting portion 42' to be above the lower bends 21. Then the pressing portion 41' is pressed down onto the pressing bars 43', and supplies energy to generate large heat for welding.

The names of the members composing the present invention and the drawings are only for illustrating the preferred embodiments of the present invention, and not for giving any limitation to the scope of the present invention. It will be apparent to those skilled in this art that various modifications or changes can be made to the elements of the present invention without departing from the spirit, scope and characteristic of this invention. Accordingly, all such modifications and changes also fall within the scope of the appended claims and are intended to form part of this invention.

What is claimed is:

1. A die set for welding fins to a base plate of a heat sink comprising a base plate and a plurality of U shaped heat sink fins, said heat sink fins are serially bent to form a plurality of U shaped bends; the surfaces of the bends to be welded to the base plate are plain and are placed on the top of said base plate which is in the form of a plain plate, said die set characterized by:

a first die seat and a second die seat, wherein, said first die seat is disposed beneath said base plate to support said base plate;

said second die seat is disposed above said U shaped heat sink fins, and comprises a pressing portion and a connecting portion; said pressing portion corresponds to each of said lower bends of said U shaped heat sink fins to be welded to said base; said pressing portion is provided with a pressing bar;

said connecting portion having a plurality of connecting ends on the bottom of each of said pressing bars to supply energy to generate sufficient heat for welding; when said pressing portion exerts force on said pressing bars, said U shaped heat sink fins are pressed against said base plate and are quickly welded thereto by the large heat produced by said connecting portion.

2. A die set for welding fins and a base plate of a heat sink as in claim 1, wherein, a supporting plate is forced on the top surface of said first die seat, and a recess is formed on the balance area of said top surface of said first die seat conforming in shape with said base plate of said heat sink, when said base plate is placed in said recess next to said supporting plate, it is borne and fixed on said first die seat.

3. A die set for welding fins and a base plate of a heat sink as in claim 1, wherein, said pressing portion on said second die seat is provided on the top thereof with a gas or liquid compressing cylinder to exert pressing force, heat produced electrically or mechanically by said connecting portion is approximately 650° C.

4. A die set for welding fins and a base plate of a heat sink as in claim 1, wherein, said die set has a clamp holder for positioning and moving said base plate and said heat sink fins by clamping at the lateral sides thereof.

5. A die set for welding fins and a base plate of a heat sink as in claim 1, wherein, a micro-protuberances are provided on said top of said first die seat corresponding to the areas of welding between said base plate and said heat sink fins.

6. A die set for welding fins and a base plate of a heat sink as in claim 1, wherein, micro-protuberances are provided on the bottom of said connecting portion of said second die seat corresponding to the areas of welding between said base plate and said heat sink fins.

7. A die set for welding fins and a base plate of a heat sink as in claim 1, wherein, said second die seat is separately provided with a pressing portion and a plurality of pressing bars, said pressing bars are located aside of said U shaped heat sinking fins, a connecting portion having a plurality of connecting ends is also provided on bottoms of said pressing bars; said pressing bars are pushed transversely toward said heat sinking fins to move said connecting portion to be above said lower bends, then said pressing portion is pressed down onto said pressing bars, and supplies energy to generate large heat for welding.

* * * * *